US005574668A

United States Patent [19]
Beaty

[11] Patent Number: 5,574,668
[45] Date of Patent: Nov. 12, 1996

[54] APPARATUS AND METHOD FOR MEASURING BALL GRID ARRAYS

[76] Inventor: Elwin M. Beaty, 13529 Arthur St., Minnetonka, Minn. 55305

[21] Appl. No.: 394,642

[22] Filed: Feb. 22, 1995

[51] Int. Cl.$^6$ .................................................. G06F 17/00
[52] U.S. Cl. ........................................ 364/558; 324/754
[58] Field of Search .......................... 340/656; 29/842; 33/551, 552, 554, 557; 361/789, 783; 324/758, 761, 754, 537, 538; 364/558

[56] References Cited

U.S. PATENT DOCUMENTS

| | | |
|---|---|---|
| 1,894,025 | 1/1933 | Dennison et al. . |
| 3,895,446 | 7/1975 | Orlov et al. . |
| 4,084,875 | 4/1978 | Yamamoto . |
| 4,463,310 | 7/1984 | Whitley ..................................... 324/73 |
| 4,603,487 | 8/1986 | Matsunata ................................. 33/551 |
| 4,754,555 | 7/1988 | Stillman . |
| 4,774,768 | 10/1988 | Chiponis . |
| 4,776,102 | 10/1988 | Carroll . |
| 4,776,103 | 10/1988 | Cote . |
| 4,849,743 | 7/1989 | Ohno . |
| 4,973,948 | 11/1990 | Roberts . |
| 5,163,232 | 11/1992 | Gonzales, Jr. et al. . |

*Primary Examiner*—Ellis B. Ramirez
*Assistant Examiner*—Tony M. Cole
*Attorney, Agent, or Firm*—Leone & Moffa, P.A.

[57] ABSTRACT

An array of touch sensors are brought in contact with a ball grid array. A linear actuator moves the array of touch sensors. The position of the linear actuator is known very precisely. As the touch sensors encounter the ball grid array, they provide a signal to a computer system that an element on the ball grid array has been encountered. The computer notes the position of the linear actuator and the particular sensor in the touch sensor array that is providing the signal. Initially, each touch sensor rests against a printed circuit board circuit with a conductive disk connecting the circuit in an unactuated position. In an actuated position, the circuit is broken by the touch sensor being forced away from the printed circuit board by the object encountered. Positive air pressure is provided against one side of the disk to press it against the contact points on the printed circuit board. An alignment plate helps prevent tilting of a touch sensor. A circular cartridge is loaded by a chip handler and multiple array sensors are used to test for board warpage and various ball grid configurations.

20 Claims, 16 Drawing Sheets

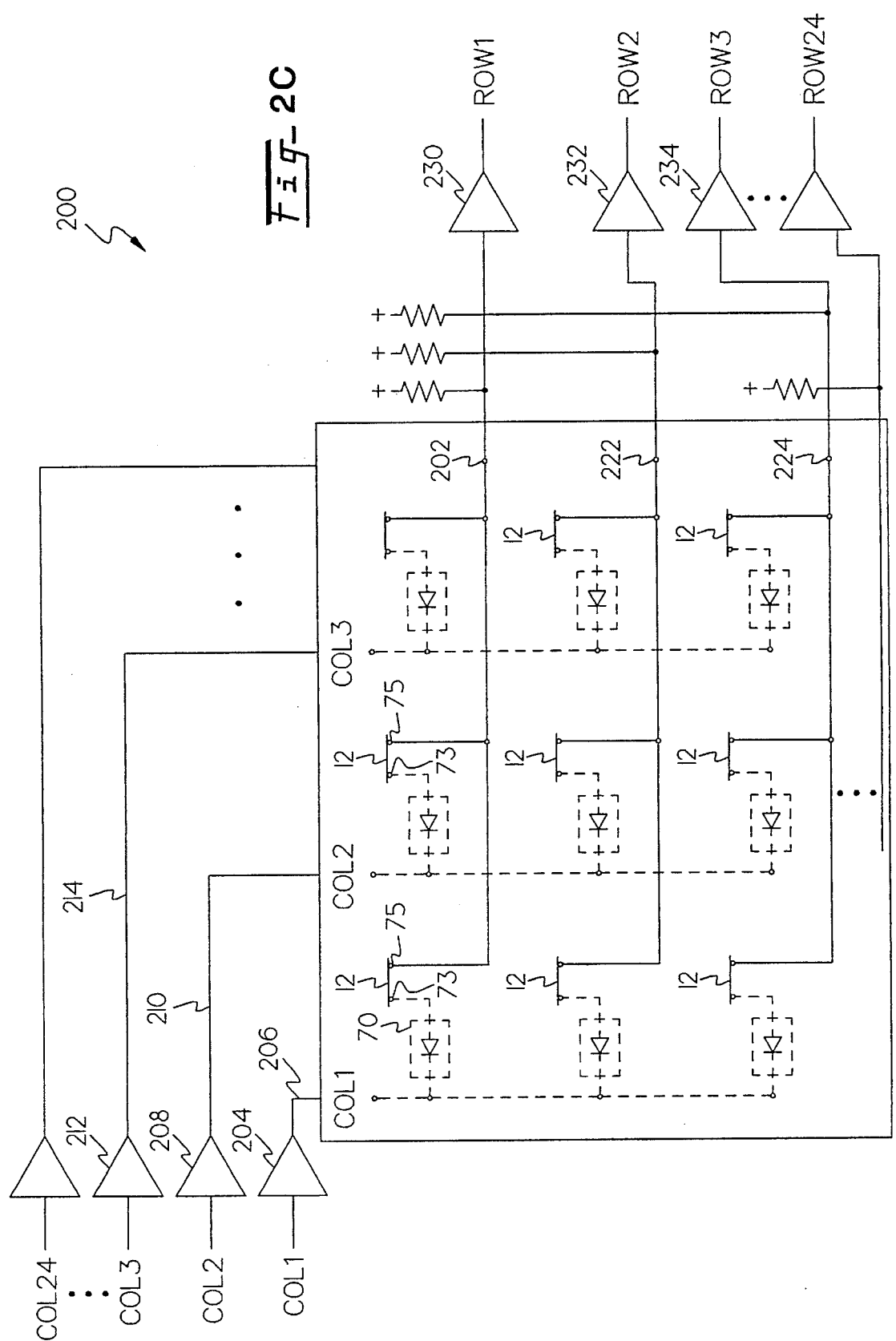

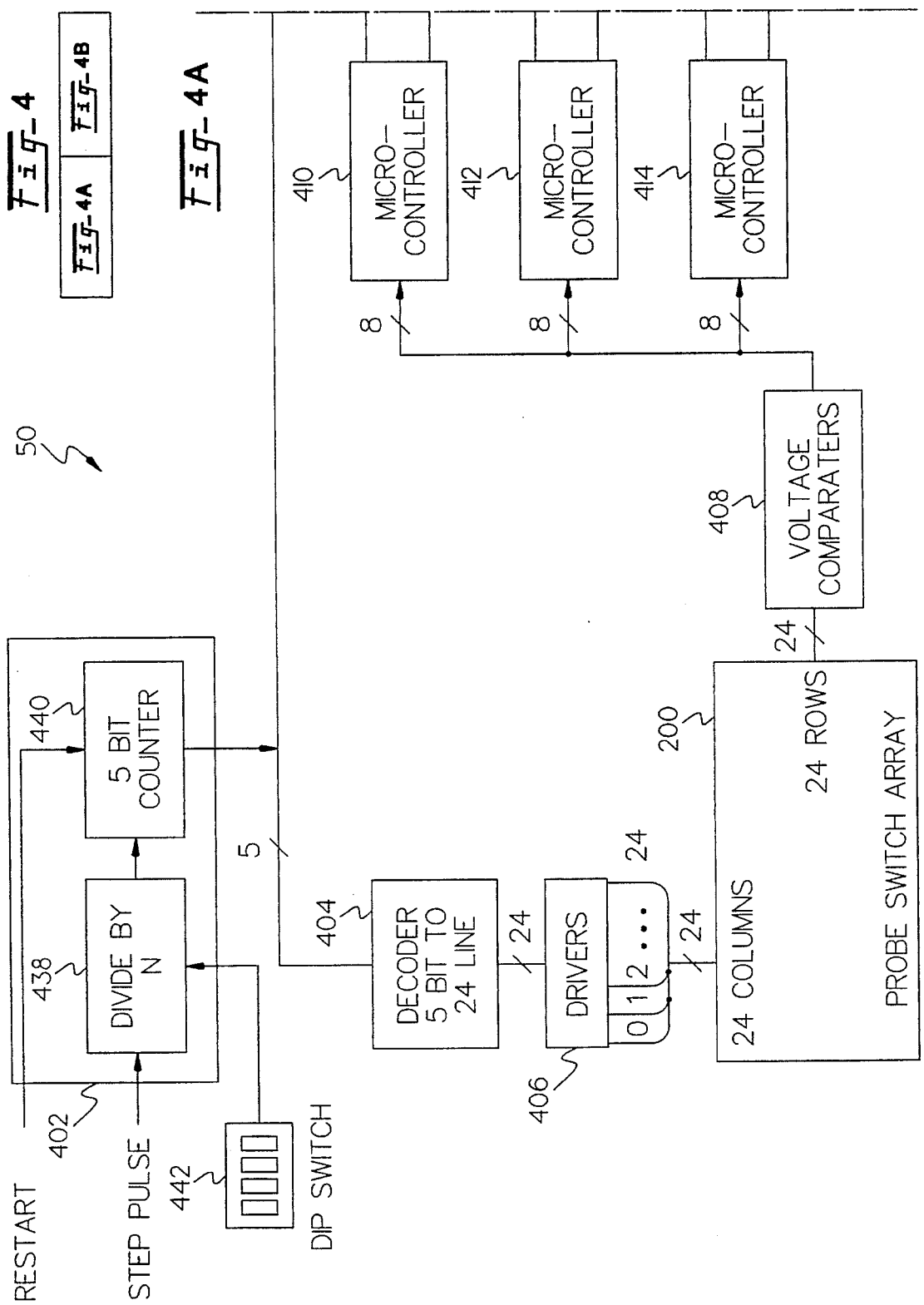

Fig-6

BGA Inspection System

Calibrate  Inspect  Settings  Maintenance  Exit

SYSTEM STATUS

Calibration: VALID

Last Calibration: 10:31 01/13/95

Part Selected: BGA225

16:11 01/13/95

IMAGES

PART STATISTICS

| Measure | Ball | Min | Ball | Max |
|---|---|---|---|---|
| Cop | D12 | 0.000 | A15 | 1.156 |
| SOff | G2 | 25.505 | F13 | 29.505 |
| Diam | C13 | 28.510 | M10 | 30.645 |
| Xerr | H5 | -4.020 | D4 | 3.560 |
| Yerr | | -3.150 | D4 | 3.250 |
| Rerr | | 0.000 | D4 | 4.820 |

INSPECTION RESULTS

| CURRENT PART | LOT TOTALS |
|---|---|
| Sort 1: PASS | Sort 1: 9 |
| Sort 2: PASS | Sort 2: 11 |
| | Fails: 2 |
| | Total: 13 |

Fig-8

TRAY DEFINITION

Tray Name: 28X28

Units: ○ mm  ● mils

| | |
|---|---|
| N1 [Columns]: | 3 |
| N2 [Rows]: | 8 |
| M: | 1100.00000 |
| M1: | 1218.00000 |
| M2: | 1460.00000 |
| M3: | 1457.00000 |
| Tray Stacking Height: | 400.000000 |
| Tray Notch Height: | 100.000000 |
| Cell Height: | 340.000000 |
| Drop Height: | 100.000000 |
| Part Pick-up Offset: | 0.000000 |

[OK]  [Cancel]

BGA TOLERANCES

Sort 1

|      | MIN  | MAX  |
|------|------|------|
| Cop  |      | 3.0  |
| SOff | 20.0 | 25.0 |
| Diam | 29.0 | 31.0 |
| Xerr | -1.0 | +1.0 |
| Yerr | -1.0 | +1.0 |
| Rerr |      | 1.4  |

Sort 2

|      | MIN  | MAX  |
|------|------|------|
| Cop  |      | 4.0  |
| SOff | 18.0 | 29.0 |
| Diam | 25.0 | 35.0 |
| Xerr | -5.0 | +5.0 |
| Yerr | -5.0 | +5.0 |
| Rerr |      | 6.0  |

● MILS    ○ MM

[ OK ]    [ Cancel ]

APPARATUS AND METHOD FOR MEASURING BALL GRID ARRAYS

BACKGROUND OF THE INVENTION

This invention relates to an apparatus for inspecting ball grid arrays and, more particularly, to a computer controlled gas pressure-backed, touch sensor array apparatus.

A ball grid array (BGA) is an array of solderable balls placed on a chip carrier. The balls contact a printed circuit board in an array configuration where, after reheat, they connect the chip to the printed circuit board. BGAs are known with 40, 50 and 60 mil. spacings in regular and staggered array patterns.

Electronic components employing BGAs need inspection. The prior art does not provide an automated means for measuring the height of the balls on top of the ball grid array, does not have a means for determining the flatness of the ball grid array, nor does it have a means for determining whether the balls have been properly formed or exist at all in their proper positions.

Some prior art methods of contacting conductors, pins or leads on printed circuit boards or chips have used spring based contact sensors or pogo pins. In many applications, the amount of force applied by springs or pogo pins would be detrimental to the ball grid array components.

Therefore, it is a motivation of the invention to provide a highly efficient, rapid and safe BGA inspection system that can measure BGA characteristics like the position and height of BGA balls and warpage of the BGA carrier among others.

SUMMARY OF THE INVENTION

The invention provides a linear motion actuator that precisely moves a stage. Attached to the stage is a sensor assembly comprising an array of touch sensors. The linear motion actuator moves the stage to contact the actuators on a ball grid array that has been moved under the stage. In one embodiment of the invention a rotary tray of ball grid arrays are loaded from a storage tray, inspected, and unloaded to a pass tray or a fail tray.

The touch sensor is composed of a conductive disk having an insulated shaft through the center. The insulated shaft is aligned with an alignment plate and protrudes through the bottom of a sensor plate. The conductive disks are provided to open or close a circuit, depending upon the state of the touch sensor. If the touch sensor contacts a ball as it is descending toward the BGA, the ball will push the sensor and break an electrical connection. As the assembly is driven toward the BGA, a computer scans the array to determine if any circuit has been broken, if it has the computer stores in a memory the particular location of the break and the position of the stage assembly at the time of the break. The sensors are impressed against the sensor plate by air pressure. The air is kept clean and dry to prevent dust or debris from entering the interior cavity of the sensor.

Other objects, features and advantages of the present invention will become apparent to those skilled in the art through the description of the preferred embodiment, claims and drawings herein wherein like numerals refer to like elements.

BRIEF DESCRIPTION OF THE DRAWINGS

To illustrate this invention, a preferred embodiment will be described herein with reference to the accompanying drawings.

FIG. 2C shows a more detailed circuit diagram of one embodiment of a probe switch array of the invention.

FIG. 6 shows an inspection system control screen.

FIG. 8 shows a tray definition screen.

FIG. 9 shows a tolerance screen.

DETAILED DESCRIPTION OF THE PREFERRED EMBODIMENT

Figure 1A:
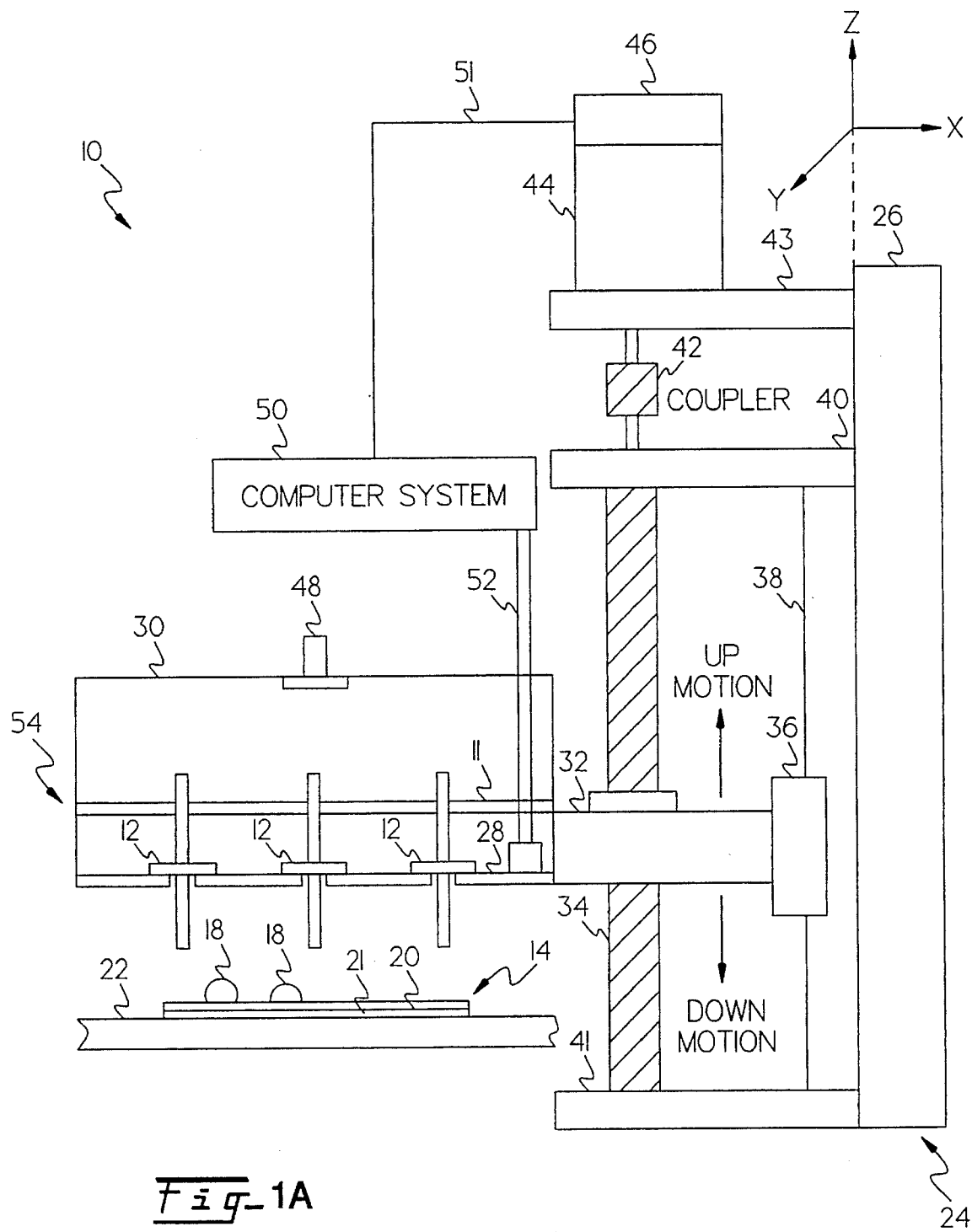
FIG. 1A shows a schematic block diagram of the ball grid array inspection system of the invention.

FIG. 1A shows a schematic diagram of an apparatus to inspect ball grid arrays built in accordance with the teachings of the invention. Stage actuator 24 is comprised of a base 26 which holds a lower bearing 41 and an upper bearing 40 and rail 38. A linear slide 36 rides up and down rail 38. The screw 34 drives stage 32, connected to slide 36, on rail 38. The coupler 42 couples the screw 34 to motor 44 which, in one embodiment, may be a servo motor, and in an alternative embodiment may comprise a stepper motor. Position sensor 46 determines the rotational position of the screw 34 which may be converted into a linear position using conventional means. The linear position of the stage 32 can also be determined by a linear encoder positioned on the rail 38. The position of the stage is sent to the computer system 50 on line 51.

Computer system 50 receives the signals from the touch sensors through cable 52. Computer system 50 is shown in more detail in FIG. 4. Attached to the stage 32 is a sensor assembly 54 comprising a housing 30 where air pressure inlet 48 provides positive air pressure to the interior of the housing 30. An alignment plate 11 provides guidance for touch sensors 12 which protrude through the base plate 28. The base plate 28 is a printed circuit board, the structure of which is shown in more detail in FIG. 2A. The ball grid array 14 is comprised of a ball 18 made of solderable material, a substrate 20 and an integrated circuit 21.

In operation, the stage 32 is driven by screw 34 until the balls on the ball grid array have been touched. While the stage is moving down, touch sensors indicate that a ball has not been touched by providing a closed signal, and indicates that a ball has been touched by providing an open signal to the computer system 50. In this way as switches are opened by the presence of balls on the ball grid array, the computer notes the position of the encoder thus determining the position of each ball on the ball grid array. The BGA 14 may be moved in relation to the sensor assembly 54 to measure the surface of the substrate 20.

Those skilled in the art will recognize that instead of a drive screw, a hydraulic or pneumatic lift can be provided where the stage 32 is lifted and then dropped. As the stage is dropped the touch sensor array is scanned as described above.

Figure 1B:
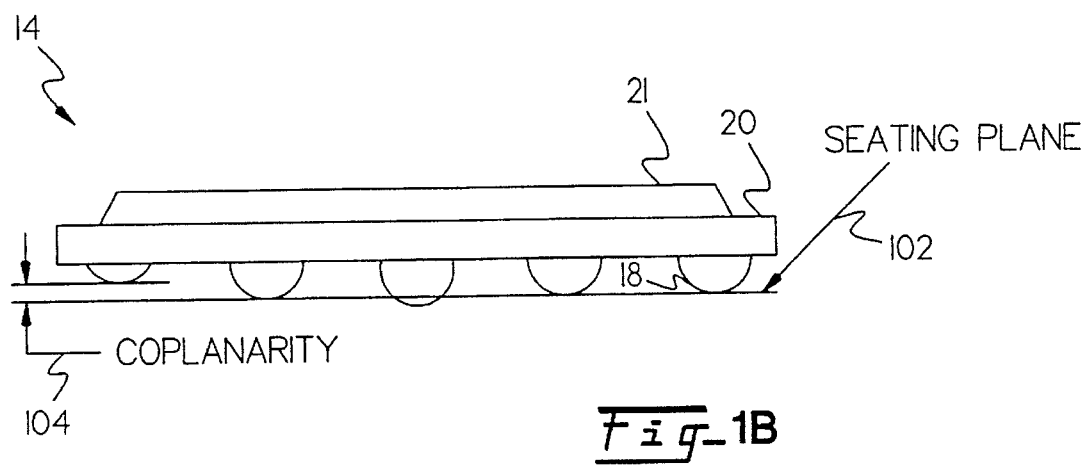
FIG. 1B shows a seating plane diagram.

Referring now to FIG. 1B which illustrates a method used to determined coplanarity of a ball grid array 14. The ball grid array 14 defines a seating plane 102 as a least squares plane or an ideal seating plane. The data of distance of the crown of each ball 18 from the entire ball grid array 14 above the substrate 20 defines the least squares plane. The distance of each individual crown of each ball 18 above or below the seating plane 102 determines a coplanarity 104 of that ball.

Figure 1C:
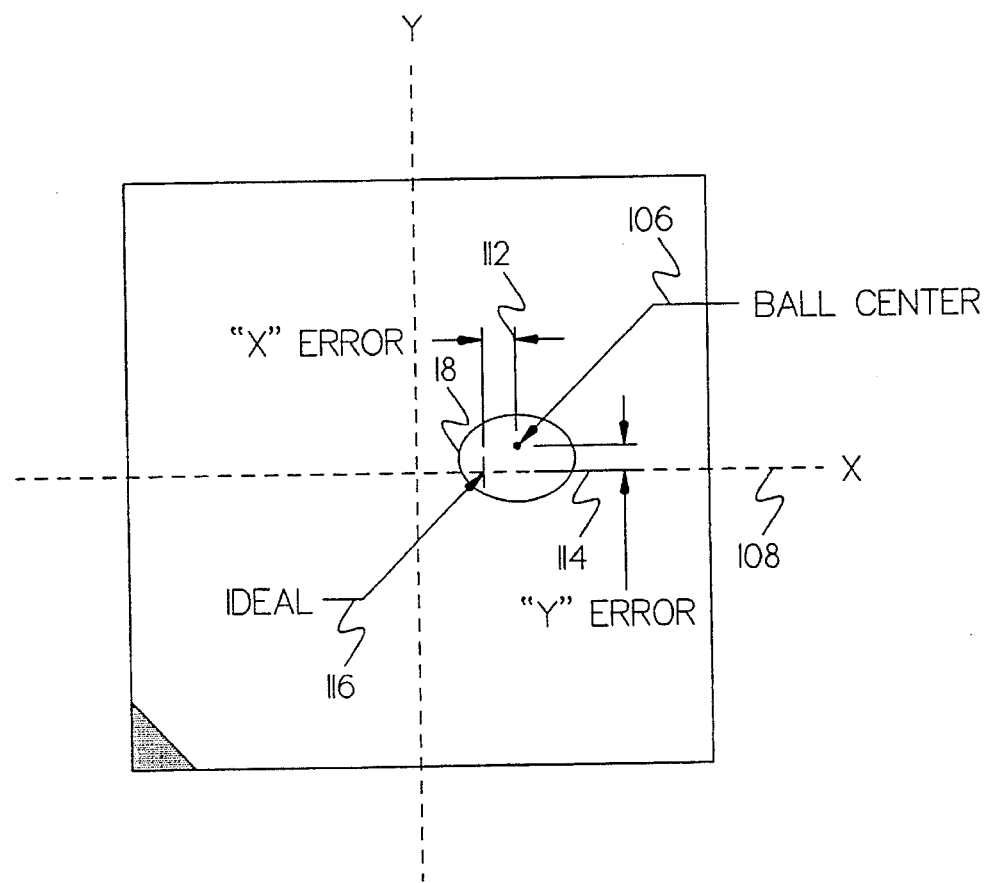
FIG. 1C shows a ball center error chart.

Referring now to FIG. 1C which illustrates deviation of the center of a ball from ideal in the plane of the integrated circuit 21. A ball 18 has a ball center 106. Deviation along the X-axis 108 from an ideal center 116 defines X ball error 112. Deviation along the Y-axis 110 from an ideal center 116 defines Y ball error 114.

Figure 1D:
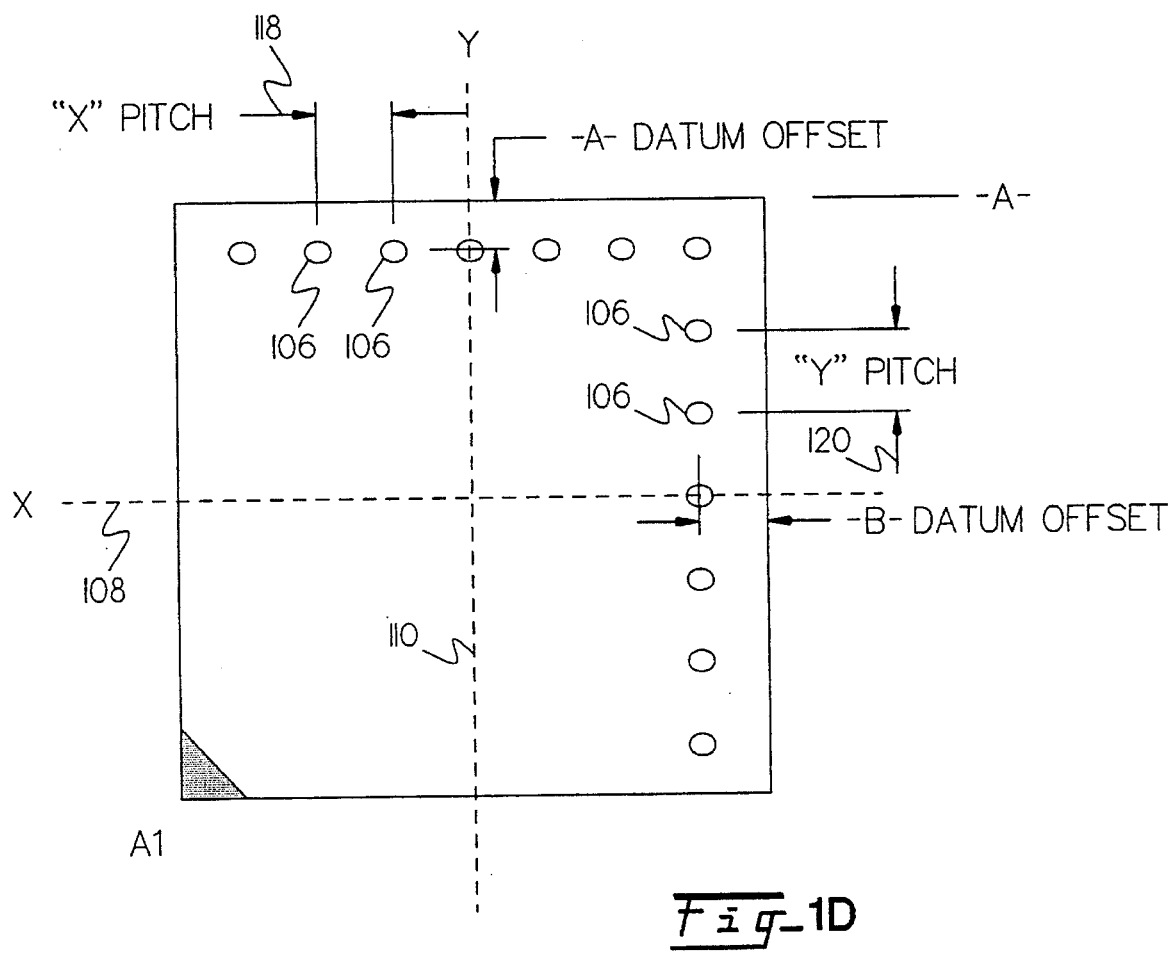
FIG. 1D shows a pitch diagram for the ball grid array.

Referring now to FIG. 1D which shows a pitch diagram for the ball grid array 14. The distance between the centers 106 of two adjacent balls 18 along the X axis 108 defines X PITCH (Xpitch) 118. The distance between the centers 106 of two adjacent balls 18 along the Y axis 110 defines Y PITCH (Ypitch) 120. The top edge of the ball grid array 14 is defined as -A- datum 122. The right edge of the ball grid array 14 is defined as -B- datum 124. The distance from the -A- datum 122 to the center of the center ball in the last row, or a center gap for an even number of rows of balls, defines an -A- DATUM OFFSET 126. The distance from the -B- datum 124 to the center of the center ball in the last column, or a center gap for even number of columns of balls, defines -B- DATUM OFFSET 128.

Figure 1E:
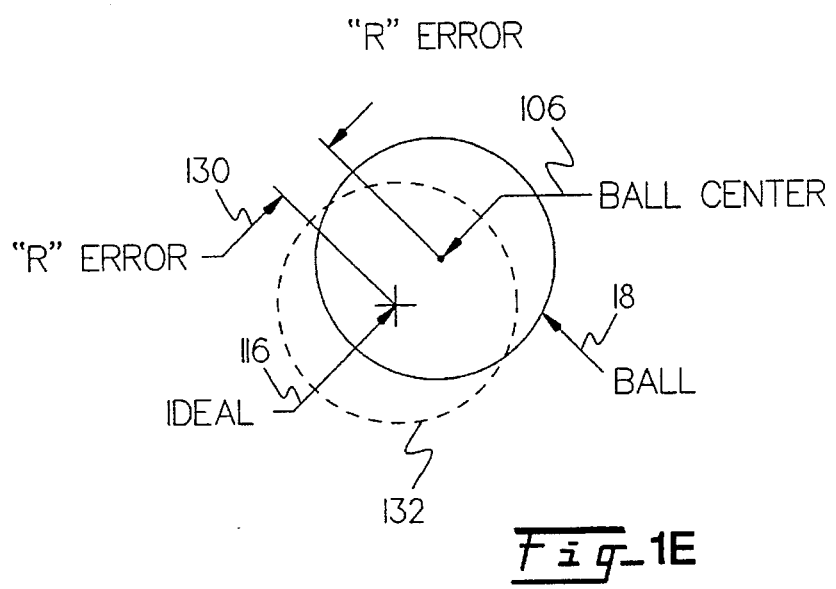
FIG. 1E shows a ball center error diagram.

Now referring to FIG. 1E which illustrates determination of radial error. The distance between the ideal center 116 and the actual center 106 of a ball 18 defines radial error (Rerr) 130. This measurement may be used to define the tolerance of the center location 106 of a ball 18 from the ideal center 116. For example, a circle of radius "R" 132 centered on the ideal ball location 116 may define the tolerance for the location of the center 106 of a ball 18. If the center 106 of a measured ball 18 lies outside of the circle 132, the ball grid array 14 fails.

Figure 1F:
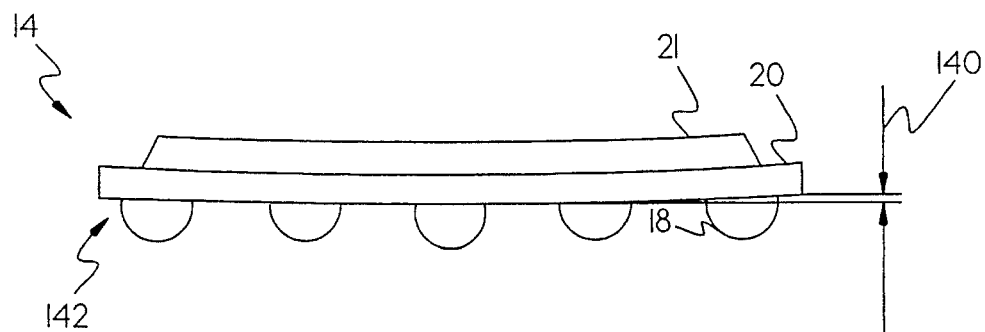
FIG. 1F shows a board warpage diagram.
Figure 1F:
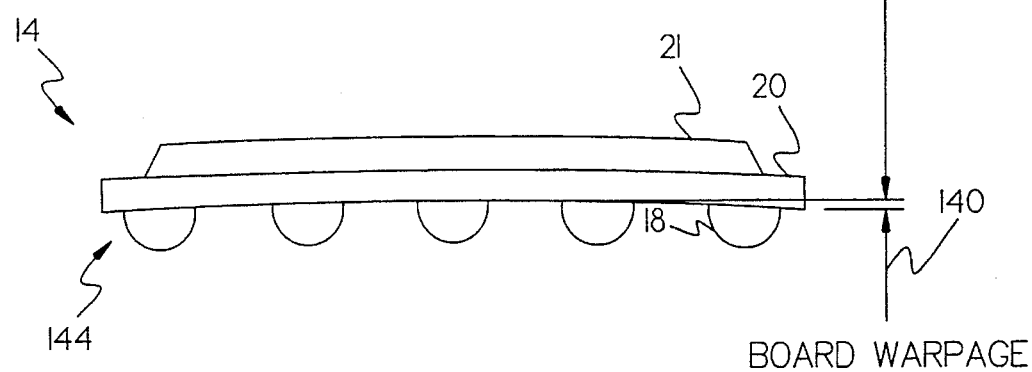

Now referring to FIG. 1F which shows an illustration of board warpage. Using a subset of the substrate measurement data the deviation of the substrate from a plane may be determined. For example, the deviation may be determined from the average of the five highest readings minus the minimum board reading as determined from the average of the five lowest readings defines board warpage 140. The board can have both positive curvature 142 and negative curvature 144.

Figure 1G:
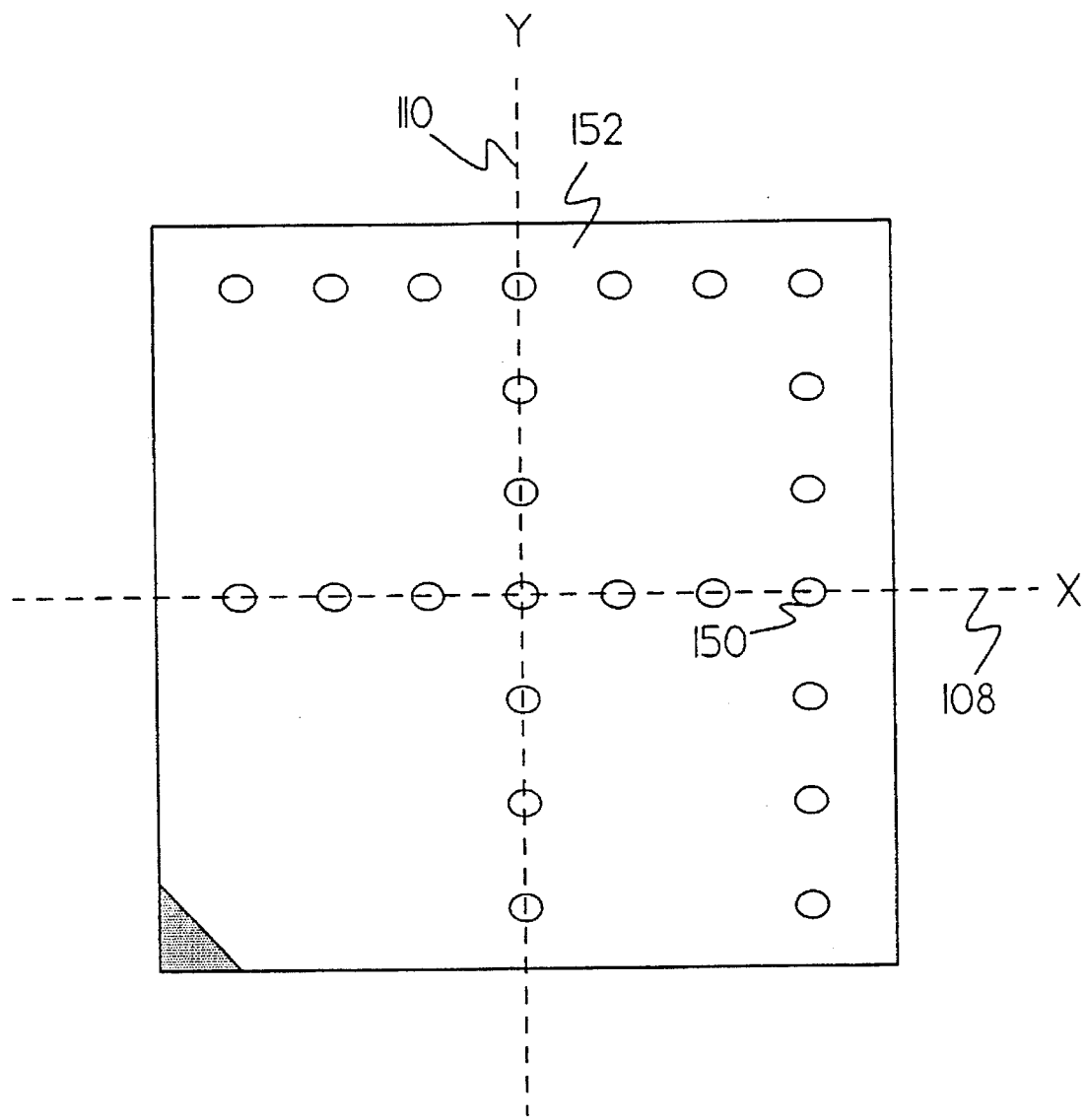
FIG. 1G shows a ball array of the ball grid array showing best fit reference coordinates.

Now referring to FIG. 1G which shows an array of the ball grid array 14 having best fit reference coordinates. The X-axis 108 may be defined to be the best line fit to the centers of the middle column of balls 150, or to the centers of the gaps between the two middle columns of balls in the case of an even number of columns. The Y-axis 110 may be defined to be the best line fit to the centers of the middle row of balls 152, or to the centers of the gaps between the two middle rows of balls in the case of an even number of rows. The angle of intercept between the X-axis 108 and the Y-axis 110 is determined and subtracted from ninety degrees to produce an error angle. The error angle is divided in half and the X-axis 108 and the Y-axis 110 are rotated by the result to provide an orthogonal coordinate system.

Figure 2A:
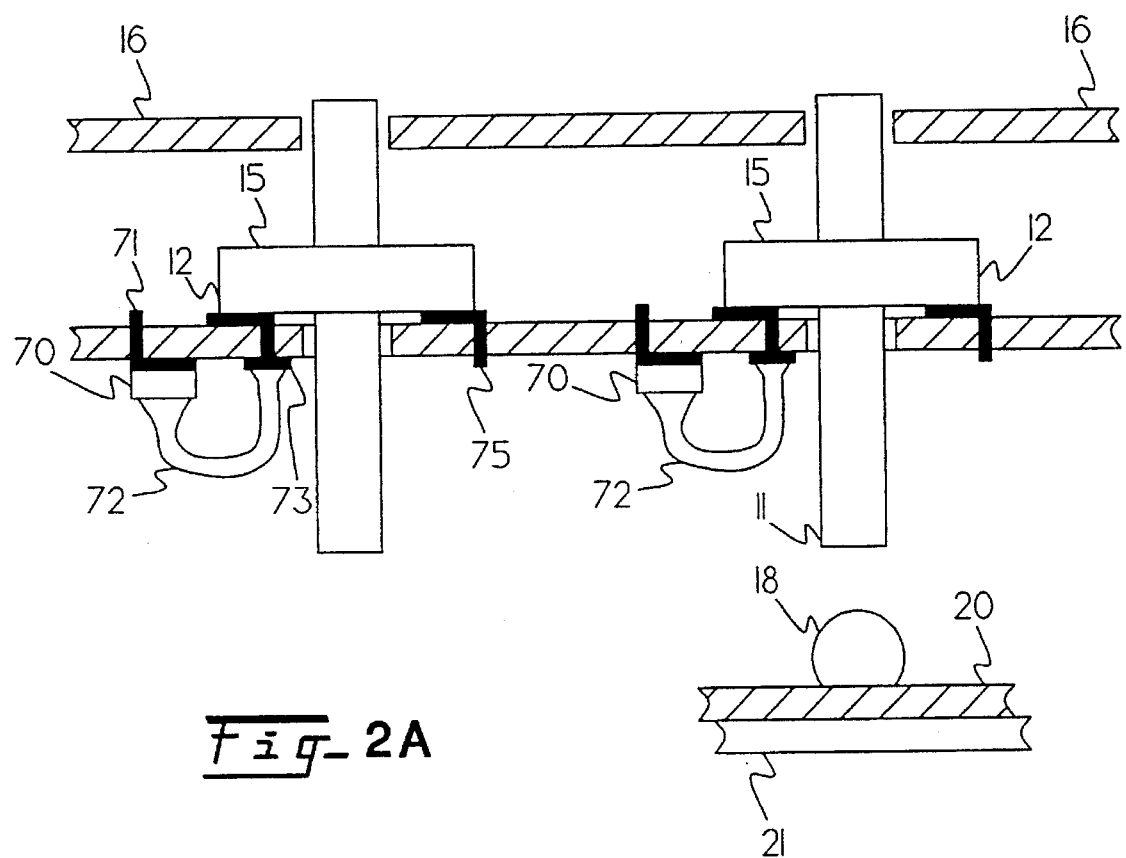
FIG. 2A shows a detailed drawing of a touch sensor of the invention.

Now referring to FIG. 2A which shows a detailed drawing of the touch sensors 12 of the invention. The touch sensors 12 comprise a probe head 15 and a probe tip 11. The touch sensors 12 rests on first contact 73 and second contact 75, mounted on the substrate 20. A chip diode 70 and a wire 72 further provide an electrical connection between the first contact 73 to a third contact 71 mounted on the substrate 20. The probe tip 11 may pass through the probe head 15 and the alignment plate 16. The probe tip 11 may comprise an insulator, and the probe head 15 may comprise a conductor. When the BGA tester 10 is at rest, the probe head 15 provides an electrical connection between the first contact 73 and the second contact 75, completing an electrical circuit to third contact 71.

When the BGA tester 10 is lowered toward substrate 20, the probe tip 11 may encounter a solder ball 18, thus raising the probe tip 11 and attached probe head 15. Raising probe head 15 breaks the electrical connection between first contact 73 and second contact 75. The alignment plate 16 provides for precise movement of the touch sensor 12, allowing for easy movement upward and downward, but restricting side to side movement. The alignment plate 16 may comprise a precisely machineable material, such as aluminum or some plastics.

Figure 2B:
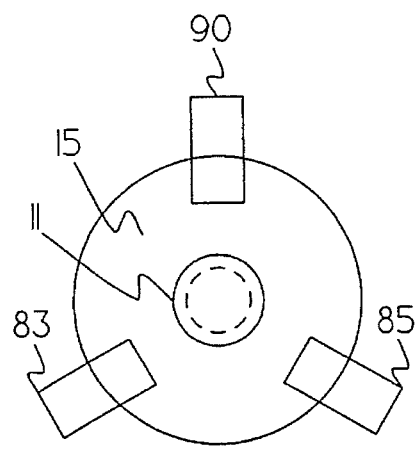
FIG. 2B shows a top down diagram of a tripod mount of the sensors of the invention.

Now referring to FIG. 2B which shows a top down diagram of a tripod mount on a printed circuit board of the touch sensor 12 of the invention. The touch sensor 12 may rest upon first mount 83, second mount 85 and third mount 90. The probe head 15 provides an electrical connection between first mount 83 and second mount 85. First mount 83 and second mount 85 are electrically conductive and are connected to the probe switch array. Third mount 90 provides for a stable tripod mount and may be nonconductive.

Referring now to FIG. 2C, a more detailed circuit diagram of one embodiment of the probe switch array of the invention is schematically shown. A probe switch array 200 comprises a matrix of rows, Row1, Row2, et seq. and columns, COL1, COL2 et seq. It is to be understood that a simplified version of the invention comprising only 24 rows and 24 columns is shown in order to promote an easier understanding of the invention and that this is by way of illustration and not limitation. One embodiment of the invention as constructed by Scanner Technologies Corporation of Minneapolis, Minn. comprises probe switch assemblies having a 24×24 matrix of probes. Other probe switch arrays of varying dimensions may be constructed using the principles of the invention.

Each row comprises a plurality of probes 12 and diodes 70 connected in series to a row output, such as a first row output 202 for ROW 1, a second row output 222 and a third row output 224. Each row output is respectively coupled to an output amplifier. In the example, the first row output 202 is coupled to a first output amplifier 230, the second row output 222 is coupled to a second output amplifier 232, and the third row output 224 is coupled to a third output amplifier 234. Each column comprises an activation means for activating each of the columns 220 during scanning of the probe switch array by individually providing an activation signal to each of the columns in turn. In one useful embodiment of the invention, the activation means comprises an amplifier coupled to a circuit path. In the example shown, column 1 COL1 includes a first amplifier 204 coupled to a first circuit path 206. Column 2 COL2 is similarly coupled to a second amplifier 208 and a second circuit path 210. Column 3 COL3 is similarly coupled to a third amplifier 212 and a third circuit path 214. As many columns and rows as needed may be constructed.

In operation, the probe switch array 200 may be used to isolate each probe position at any time during a scan cycle by applying an activation signal to any specific column. While the activation signal is applied, the row outputs provide an indication as to whether or not the probe for the selected row and column is making contact or breaking contact with the circuit terminal contacts, for example, contacts 73 and 75. That is, when the head 12 is raised above the terminal contacts 73, 75, the circuit is broken and the row output will exhibit a signal representative of the broken circuit. The height of the solder ball, defined as the distance from the substrate in the vicinity of the ball to the crown of the ball, may then be determined from reading the encoder or by knowing the position of the stepper motor in the case where a stepper motor may be used. Those skilled in the art having the benefit of this disclosure will understand that there are equivalent circuits which may function in accordance with the teachings of this invention, such as circuits wherein polarities are rearranged, and the invention is not to be considered as limited to the example circuit described herein.

Figure 3A:
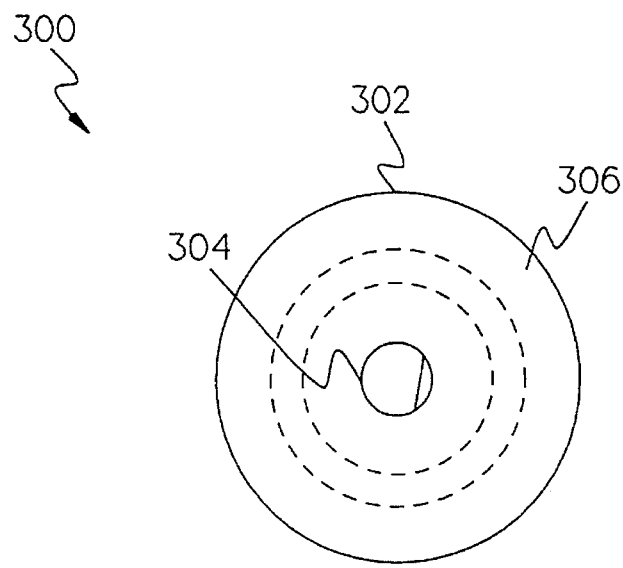
FIG. 3A shows a circular ridge contact configuration.

FIG. 3A shows a touch sensor having a circular ridge contact configuration. The touch sensor 300 includes a probe head 302, a probe tip 304 and a contact ridge 306. The probe head 302 and the probe tip 304 may comprise nonconductive material. The contact ridge 306 may rest upon contacts to the probe switch array and may provide an electrical connection between the contacts to the probe switch array.

Figure 3B:
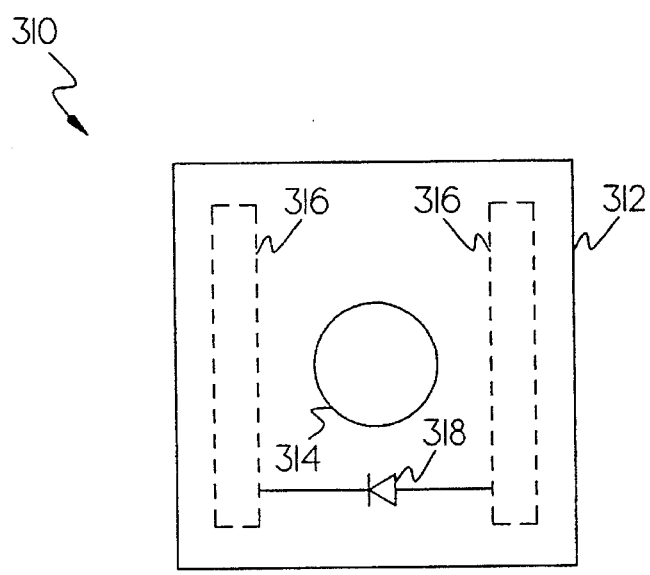
FIG. 3B shows a linear contact ridge configuration.

FIG. 3B shows a touch sensor 310 having a linear contact ridge configuration. The touch sensor 310 includes a probe head 312, a probe tip 314, contact ridges 316 and a contact diode 318. The probe head 312 and the probe tip 314 may comprise nonconductive material. The contact ridges 316 may be electrically conductive and are connected by the diode 318. The contact ridges 316 may rest upon contacts to the probe switch array, and with diode 318, may provide an electrical connections between the contacts to the probe switch array.

Figure 4B:
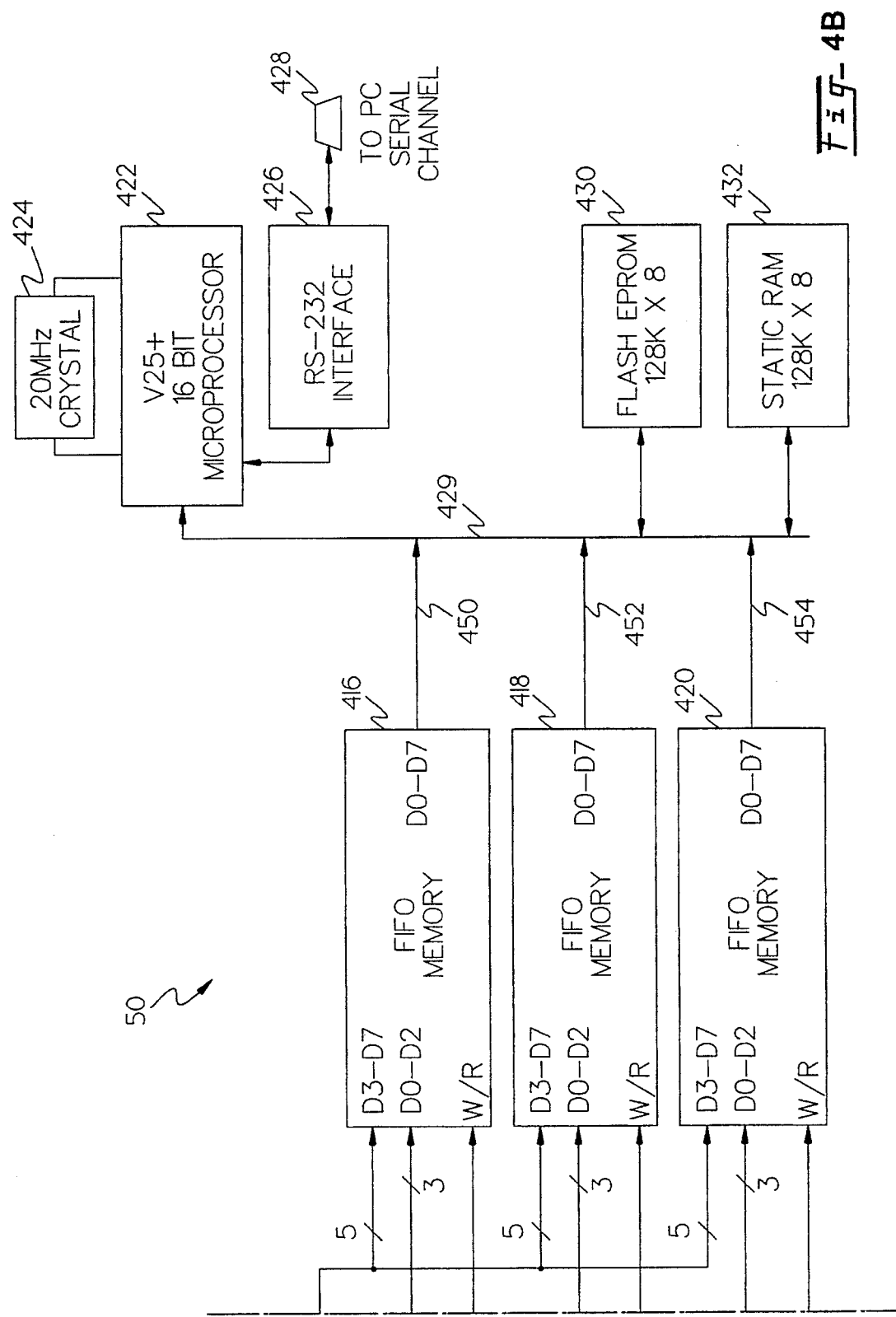
FIG. 4 shows a schematic block diagram of the scanning electronics of the invention.

Referring now to FIG. 4, a block diagram of one embodiment of the computer system 50 built in accordance with the principles of the invention is shown. There shown is a computer system 50 comprising a means for counting 402, a decoder 404, a plurality of drivers 406, a probe switch array 200, and voltage comparators 408. Further included are first through third microcontrollers 410, 412 and 414, first through third First In First Out (FIFO) memories 416, 418, and 420, a flash memory 430, a static Random Access Memory (RAM) 432, and a microprocessor 422. As will be appreciated by those skilled in the art, apart from the probe switch array, the components which comprise the computer system 50 may be comprised of commercially available integrated circuits.

The counter circuit may advantageously comprise a divide-by-N circuit 438 coupled to a 5 BIT counter 440. The divide-by-N circuit 438 may be programmed by, for example a dual in line switch such as DIP switch 442. The 5 BIT counter is coupled to decoder 404 and each of the first through third FIFO memories 416, 418 and 420. In this example, the decoder 404 may advantageously comprise a 5 BIT to 24 line decoder. The decoder 404 outputs 24 BITs in parallel to the drivers 406. A selected one of the drivers 406 is coupled to each of the columns in the probe switch array 200 as discussed hereinabove. The row outputs from the probe switch array 200 may be coupled in parallel to a plurality of voltage comparators 408 or equivalently functioning interface devices. The voltage comparators 408 are then coupled to the first through third microcontrollers, where, in this example, each microcontroller receives output signals from eight of the 24 rows.

The first through third microcontrollers are conventionally operated to control the flow of row output data into and out of the first through third FIFO memories 416, 418 and 420 respectively. The first through third FIFO memories 416, 418 and 420 each have data outputs 450, 452 and 454 coupled to bus 429. Also coupled to bus 429 are the flash memory 430, static RAM 432 and microprocessor 422. The microprocessor 422 may be clocked by a crystal oscillator which may advantageously operate at about 20 megahertz in one example embodiment. The microprocessor may be coupled to a host personal computer (PC not shown ) through a standard RS-232 interface 426 coupled to a PC serial channel 428.

Having described the elements of the computer system 50, the operation will now be described to promote a better understanding of the invention and its useful applications. Reading information from a switched matrix has long been understood in the art. An analogous example of such apparatus is reading keystrokes from a computer keyboard terminal. The circuitry comprising the first through third microcontrollers 410, 412 and 414, first through third First In First Out (FIFO) memories 416, 418, and 420, flash memory 430, static Random Access Memory (RAM) 432, and microprocessor 422 may be configured using well known techniques to read the appropriate outputs from the probe switch array 200. Flash memory 430 and static Random Access Memory (RAM) 432 may advantageously contain on-board programs such as mathematical functions and programs for data manipulation so as to off load selected processing functions from the microprocessor 422 or host personal computer. Such functions and programs may be designed according to well known techniques depending upon the particular application.

Restart signals for scanning and the step pulse which controls the screw drive may be generated externally by the host personal computer. In one example, the counter circuitry operates to run a scan of the entire probe switch array every 25 microseconds.

The following measurements may be provided to the host personal computer for each grid position:

Coplanarity is defined as the ideal seating plane or least squares plane.

Standoff is defined as the ball height at the crown above the immediate substrate area.

Ball diameter is defined as the maximum diameter.

X position error is defined as the distance from the measured ball's centers deviation from the ideal position.

Y position error is defined as the distance from the measured ball's centers deviation from the ideal position.

Radial error is defined as the radial distance of the measured ball's centers deviation from the ideal position. This is used to perform calculates if the ball's center is outside a tolerance defined by a radius entered in the tolerances settings.

Ball pitch is defined from the X and Y error measurements.

Other data may be generated from the measurements provided by the probe switch array as desired.

Figure 5A:
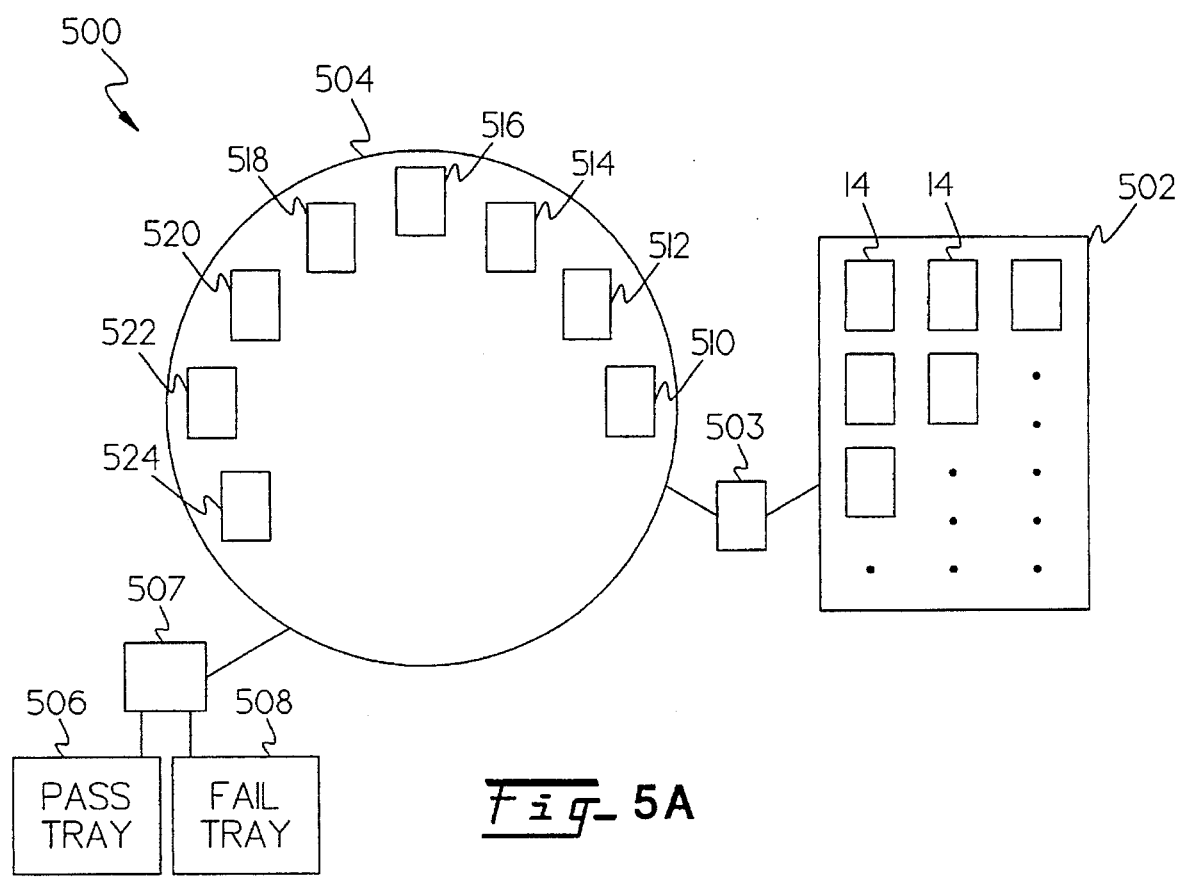
FIG. 5A shows a schematic diagram of a system employing multiple ball grid array inspection stations on a circular cart carriage.

FIG. 5A shows a schematic diagram of a system employing multiple ball grid array inspection stations on a circular cart carriage. The system 500 includes an input tray 502, a carousel 504, a pass tray 506 and a fail tray 508. The input tray 502 may contain a plurality of ball grid arrays 14. A part handler 503 may transport a ball grid array 14 from the input tray 502 to the carousel 504. Typically the ball grid arrays are carried balls down on the input tray and are inverted for placement onto the carousel. A suitable mechanism for inverting the BGAs at both the input and output trays may be used. Such part handling mechanisms are well known. In one preferred embodiment, the part handler 503 may comprise a vacuum pick and place unit. The part handler may place the ball grid array 14 on the carousel 504 at location 510. The carousel 504 rotates to move the ball grid array 14 to a first BGA tester station 512. A first BGA tester at station 512 probes the substrate level 20 and provides a substrate level value. The carousel 504 then rotates to bring the ball grid array 14 to a second BGA tester station 514. A second BGA tester at station 514 may test all or a portion of the ball grid array 14. Third, fourth and fifth BGA tester stations 516, 518 and 520 may be used to completely test the ball grid array 14. As discussed in further detail in FIG. 5B, a plurality of BGA testers may be required to completely test the ball grid array 14. After the fifth BGA tester station 520, the carousel 504 rotates the ball grid array 14 to a CCD array station 522 for determination of X-axis and Y-axis coordinates by viewing through a CCD camera. Those skilled in the art will recognize that a CCD camera may be used to determine the X,Y position of each ball in the ball grid array and array characteristics discussed above using standard image processing techniques. The carousel 504 then rotates the ball grid array 14 to location 524 where a second part handler 507 transfers the ball grid array 14 to either a pass tray 506 or a fail tray 508 as appropriate.

Figure 5B:
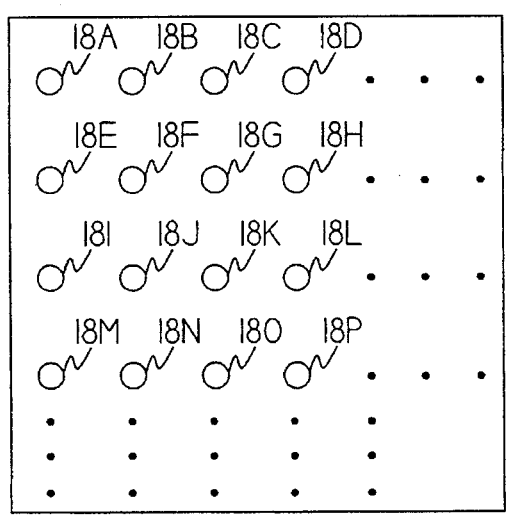
FIG. 5B shows a portion of a ball grid array.

FIG. 5B shows a portion of a ball grid array 14. Some dense ball grid arrays may have pitches of 40 mils center to center or less. In these cases a plurality of BGA testers may be used to test these dense ball grid arrays. A system such as described in conjunction with FIG. 5A may be used to test a ball grid array 14 in incremental steps. In one embodiment, the second BGA tester may only test every other ball, for example balls 18A, 18C, 18I and 18K. The third BGA tester may test balls 18B, 18D, 18J and 18L. The fourth BGA tester then tests balls 18E, 18G, 18M and 18O and the fifth BGA tester tests balls 18F, 18H, 18N and 18P. In this example embodiment, four BGA testers are needed to completely test the ball grid array 14.

Now referring to FIG. 6, FIG. 6 shows one example of a main inspection screen 600 for a user interface as it may appear on a host personal computer display as part of a BGA inspection system employing the probe switch array apparatus of the invention. The main inspection screen may be generated in accordance with standard software programming techniques and languages. In one particular embodiment, at the top of FIG. 6 is a main menu selection bar 610 and on that are a number of options that the operator can choose including "Calibrate" 612, "Inspect" 614, "Settings" 616, "Maintenance" 618 and "Exit" 620. The option designated "Calibrate" 612 may be selected by an operator to perform a function of automatic calibration for the apparatus including, for example, the probe switch array and a CCD camera where the CCD camera performs other image measurement functions in the BGA inspection system. If the operator selects "Inspect" 614 from the menu bar, the operator may activate an automatic inspection cycle including part handling, part placement and all of the information that is required to measure the part as performed for that option. The next option called "Settings" 616 may be used for a setup option by which the operator may enter definitions for the type of part being inspected. Such definitions may include, for example, the pitch (i.e. center-to-center distance of the ball grid array) of the part and other parameters of the particular part being inspected. The "Settings" option may also be used to identify a tray for carrying the parts. In another aspect of the "Settings" 616 option tolerances may be defined. An operator may use selections within the "Maintenance" option 618 for exercising the ball grid array inspection system in a maintenance mode for trouble shooting the machine and using software diagnostics. The last option is "Exit". Passwords for the ball grid array inspection system are selected through exit, including the password to exit the system.

A live image of a view of the ball grid array under inspection may be presented to the operator on an "Images" section 622 of the display. Other information including "System Status" 624 "Inspection Results" 626 and "Part Statistics" 628 may also be displayed.

Figure 7:
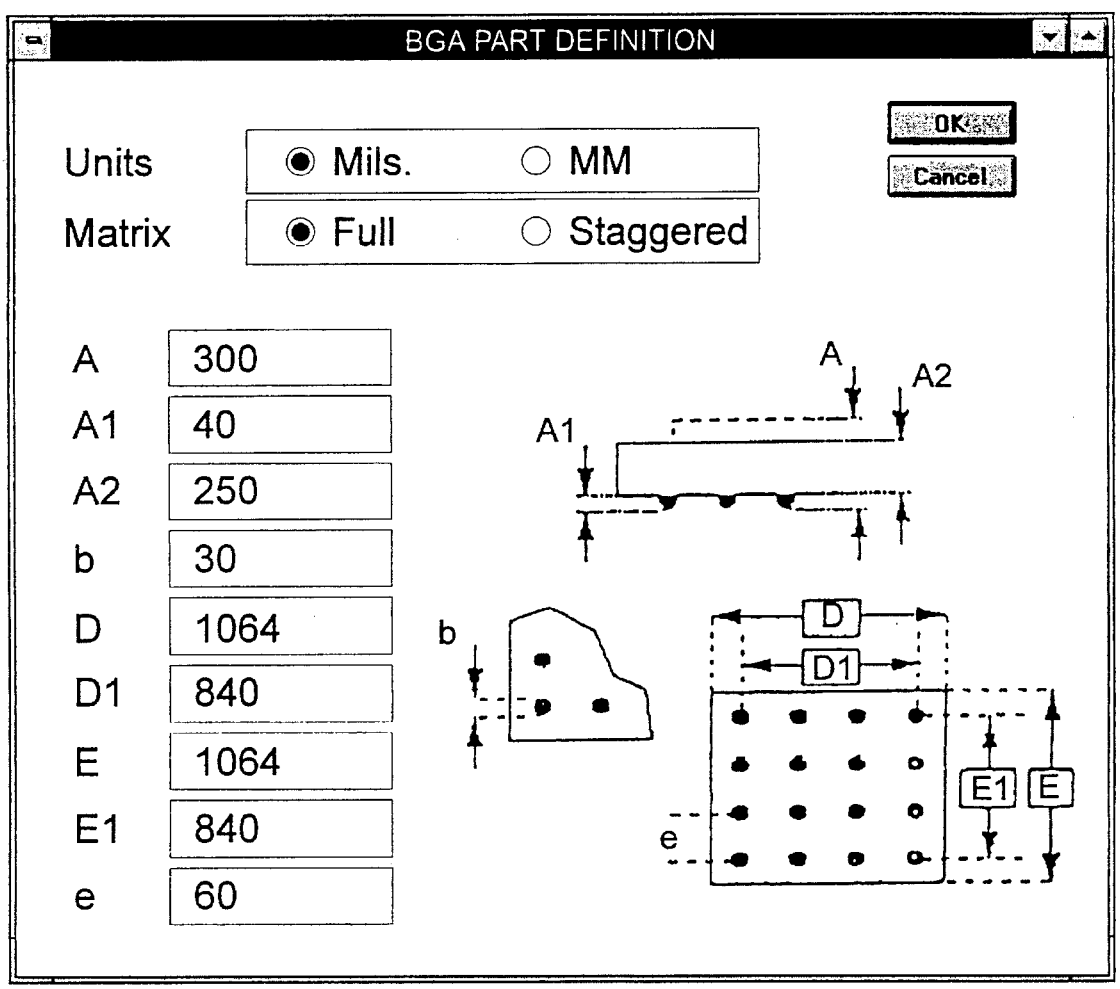
FIG. 7 shows the inspection system part definition screen.

Now referring to FIG. 7, a BGA part definition screen 700 is shown. There displayed are characteristics for ball grid array parts.

FIG. 8 shows a tray definition screen 800 including, carrier tray statistics as, for example, notch height, stacking height, cell height, drop height and part pick-up offset.

FIG. 9 shows tolerances that may be applied to ball grid array. "Rerr" defines the tolerance for the ball position. The radius of a circle from the ideal position can be defined on the tolerance screen. If the actual center of a ball is outside of this circle, it fails. Reports and data may also be similarly displayed including part measurements, lot statistics, single part statistics and a lot summary report.

Figure 10:
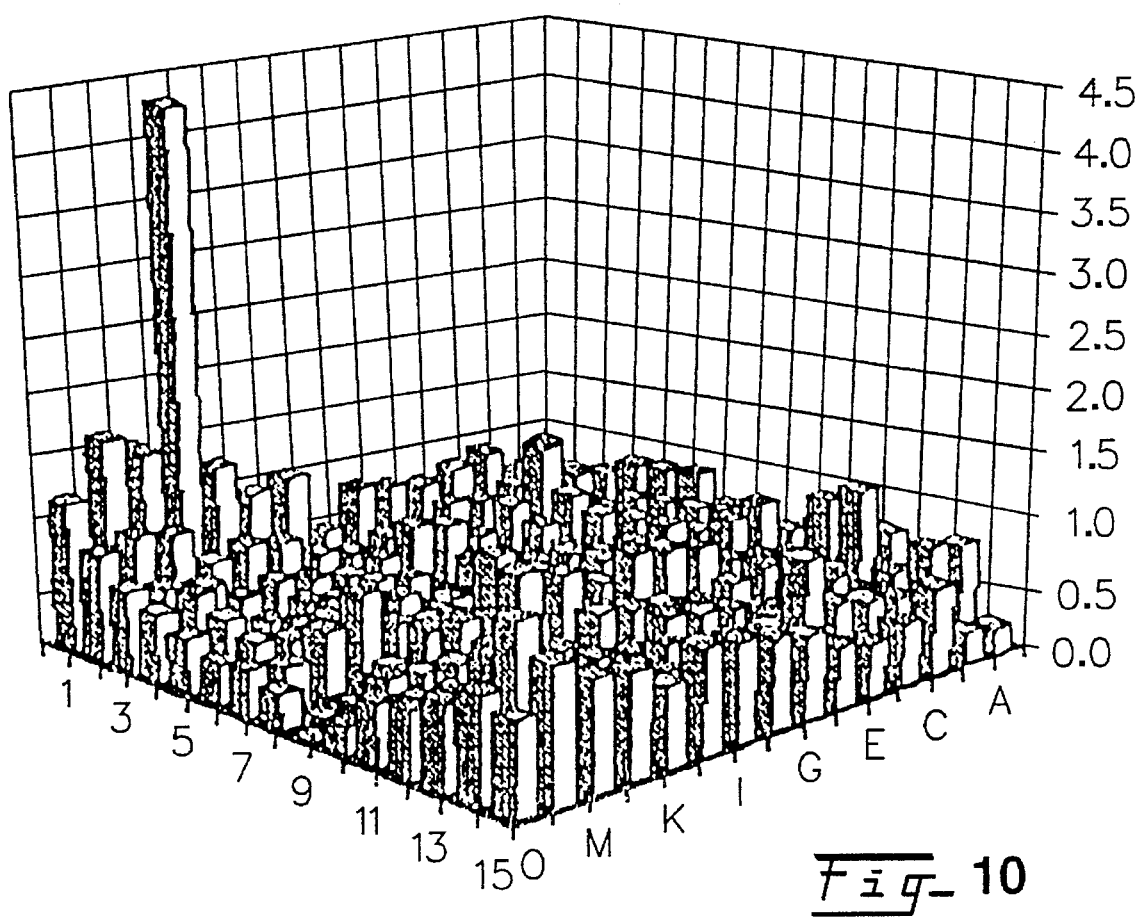
FIG. 10 shows a graph of the results of a single probe of the invention stepped and repeated across a ball grid array.

FIG. 10 shows a graphical display illustrating three dimensional (3D) charting of one example of a ball grid array inspected using one touch sensor apparatus of the present invention. The 3D charting allows easy viewing of complex data. Other graphical presentations such as, for example, histograms may also be generated using the data provided by the apparatus of the present invention.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A ball grid array measurement apparatus for inspecting a ball grid array comprising:

(a) a base;

(b) fixture means, connected to the base, for holding the ball grid array;

(c) actuating means, connected to the base, for moving a stage in at least one axis in response to a motion control signal;

(d) position sensing means, connected to the stage, for sensing a position of the stage, wherein the position sensing means has a position output;

(e) touch sensor means, connected to the stage, for sensing contact with the ball grid array when the actuating means moves the stage toward the ball grid array, wherein the touch sensor means further comprises a plurality of gas pressure backed contact switches, each in a predetermined position, and each having a contact signal; and (f) computer processor means, connected to receive the contact signal and position signal, for storing the position of the stage at a time of contact to measure the ball grid array at the predetermined position.

2. The apparatus of claim 1 wherein the touch sensor means comprises a plurality of touch sensors wherein each touch sensor provides a touch signal when the touch sensor touches a component of the ball grid array wherein the touch sensor means has a touch signal output.

3. The apparatus of claim 1 wherein the touch sensor means further comprises:

(a) a conductive disk with a central hole;

(b) a pin inserted through the hole for contacting the ball grid array.

4. The apparatus of claim 1 wherein the touch sensor means further comprises a printed circuit board means having a plurality of holes corresponding to a number of touch sensors wherein the touch sensor protrudes through the bottom of the hole and a conductive member closes a circuit on the printed circuit board to generate the contact signal.

5. The apparatus of claim 4 wherein a guide plate is provided to guide the touch sensors.

6. The apparatus of claim 1 wherein the actuating means comprises a servo motor.

7. The apparatus of claim 1 wherein the actuating means comprises a stepper motor.

8. The apparatus of claim 1 wherein the actuating means comprises a servo motor with a linear encoder.

9. The apparatus of claim 1 wherein the actuating means comprises a servo motor with an angular encoder.

10. The apparatus of claim 1 wherein the touch sensor is raised by a vacuum suction means for lifting the touch sensor means and wherein the touch sensor means is dropped in response to a send signal.

11. The apparatus of claim 1 wherein the touch sensor means comprises a matrix of rows and columns wherein each row comprises a plurality of probes and diodes connected in series to a row output and wherein each row output is respectively coupled to an output amplifier, wherein each column comprises an activation means for activating each of the columns by individually providing an activation signal to each of the columns in turn such that, while the activation signal is applied, the row outputs provide an indication as to whether or not a probe in the selected row and column is making contact or breaking the contact switches.

12. The apparatus of claim 1 wherein the computer processor means comprises:

(a) a means for counting having a count output;

(b) a decoder having an input coupled to the count output, the decoder having a decoded output responsive to the count output;

(c) a plurality of drivers coupled to the decoded output and having a plurality of driver outputs coupled to the touch sensor means;

(d) at least one microcontroller;

(e) means for storing BGA data having data and memory input coupled to the at least one microcontroller; and (f) a microprocessor coupled to control the storing means.

13. The apparatus of claim 1 wherein the touch sensor comprises:

(a) a positive gas pressure container, having a container bottom;

(b) a first flat mount, connected and position in the positive gas pressure container, having a first plurality of holes, wherein each hole has a first electrical contact and a second electrical contact disposed on an edge of each hole;

(c) a second flat mount, connected and positioned at the container bottom, having a second plurality of holes disposed relative to the first plurality of holes; and (d) a plurality of flat conductive plates with projecting insulating pins, wherein a first pin end protrudes through one of the first plurality of holes and protrudes through a corresponding one of the second plurality of holes out past the container bottom for contact with the ball grid array.

14. The apparatus of claim 1 wherein the position sensing means comprises a linear encoder.

15. The apparatus of claim 1 wherein the position sensing means comprises a rotary encoder.

16. The apparatus of claim 1 wherein the touch sensor further comprises an electrically insulated pin disposed through a conductive disk.

17. A ball grid array touch sensor grid for sensing a ball grid array, the ball grid array touch sensor grid comprising:

(a) a positive gas pressure container, having a container bottom;

(b) a first flat mount, connected and position in the positive gas pressure container, having a first plurality of holes, wherein each hole has a first electrical contact and a second electrical contact disposed on an edge of each hole;

(c) a second flat mount, connected and positioned at the container bottom, having a second plurality of holes disposed relative to the first plurality of holes; and (d) a plurality of flat conductive plates with projecting insulating pins, wherein a first pin end protrudes through one of the first plurality of holes and protrudes through a corresponding one of the second plurality of holes out past the container bottom for contact with the ball grid array.

18. A method of measuring a ball grid array comprising the steps of:

(a) mounting the ball grid array on a test mount;

(b) moving a ball grid array touch sensor array toward the ball grid array, wherein the ball grid array touch sensor array comprises a plurality of touch sensors at predetermined positions;

(c) scanning each touch sensor on the ball grid array touch sensor array; and (d) noting the position of the test mount when any one of the touch sensors activate; and (e) measuring a corresponding position on the ball grid array.

19. A ball grid array measurement apparatus comprising:

(a) a conveyor;

(b) a means for containing a plurality of ball grid arrays;

(c) a first means for transporting a ball grid array from the means for containing a plurality of ball grid arrays to the conveyor;

(d) a plurality of ball grid array testers, wherein each of the plurality of ball grid array testers tests a portion of the ball grid array and provides ball data, and the conveyor conveys the ball grid array to each of the plurality of ball grid array testers;

(e) a means for imaging, wherein the imaging means determines a location of balls on the ball grid array and provides location data;

(f) a means for computing connected to receive the ball data and the location data and provides pass or fail data;

(g) a second means for transporting the ball grid array from the conveyor and connected to receive the pass or fail data;

(h) a first storing means for storing ball grid arrays, wherein the first storing means receives ball grid arrays having pass data from the conveyor; and (i) a second storing means for storing ball grid arrays, wherein the second storing means receives ball grid arrays having fail data from the conveyor.

20. The apparatus of claim 19 wherein each of the plurality of ball grid array testers further comprises:

(a) a base;

(b) fixture means, connected to the base, for holding the ball grid array;

(c) actuating means, connected to the base, for moving a stage in at least one axis in response to a motion control signal;

(d) position sensing means, connected to the stage, for sensing the position of the stage, wherein the position sensing means has a position output;

(e) touch sensor means, connected to the stage, for sensing contact with the ball grid array when the actuating means moves the stage toward the ball grid array, wherein the touch sensor means further comprises a plurality of gas pressure backed contact switches, each in a predetermined position, and each having a contact signal; and (f) computer processor means, connected to receive the contact signal and position signal, for storing the position of the stage at the time of contact to measure the ball grid array at the predetermined position.

* * * * *